United States Patent
Mori

(10) Patent No.: US 11,681,476 B2
(45) Date of Patent: Jun. 20, 2023

(54) INFORMATION PROCESSING APPARATUS, METHOD FOR DETECTING ABNORMALITY, AND NON-TRANSITORY RECORDING MEDIUM

(71) Applicant: Satoshi Mori, Kanagawa (JP)

(72) Inventor: Satoshi Mori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/449,123

(22) Filed: Sep. 28, 2021

(65) Prior Publication Data

US 2022/0121403 A1 Apr. 21, 2022

(30) Foreign Application Priority Data

Oct. 21, 2020 (JP) .............................. JP2020-176878

(51) Int. Cl.
*G06F 3/12* (2006.01)

(52) U.S. Cl.
CPC ............ *G06F 3/121* (2013.01); *G06F 3/1229* (2013.01)

(58) Field of Classification Search
CPC ........ G06F 3/121; G06F 3/1229; G06F 11/00; G06F 11/006; G06F 11/0766; G06F 11/0769; G06F 11/0778; G06F 11/0787

USPC ................................. 358/1.14, 1.15; 399/10
See application file for complete search history.

(56) References Cited

U.S. PATENT DOCUMENTS

2006/0107088 A1* 5/2006 Katayama ............. H04L 43/065
714/4.1
2008/0141076 A1* 6/2008 Hu ......................... G06F 11/00
714/45

FOREIGN PATENT DOCUMENTS

JP 2011-159141 8/2011

* cited by examiner

*Primary Examiner* — Jamares Q Washington
(74) *Attorney, Agent, or Firm* — IPUSA, PLLC

(57) ABSTRACT

An information processing apparatus includes circuitry. The circuitry generates an abnormal end file in response to an occurrence of an abnormal end of a process being executed, the abnormal end file indicating an occurrence state of the abnormal end, extracts a part of information from the generated abnormal end file, writes the extracted information as abnormal information in a memory, reads the abnormality information from the memory, and displays the abnormality information on a display.

10 Claims, 5 Drawing Sheets

FIG. 6

```
                                        151
Cause: SEGV
Address: 0x00000000

PC:   0x0800429a
REGA: 0xXXXXXXXX
REGB: 0xXXXXXXXX

Backtrace:
0: print(0)
1: main()
2: _init()
```

FIG. 7

```
                                                                           161
PROCESSED FLAG, PROCESS ID, PROCESS NAME, SEGV, 0x00000000, 0x0800429a
F, 1035, "system_control", SEGV, 0x5a5a0000, 0x081bb7a4
T, 2044, "printer", SEGV, 0x00006600, 0x1408056D
```

INFORMATION PROCESSING APPARATUS, METHOD FOR DETECTING ABNORMALITY, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2020-176878, filed on Oct. 21, 2020, in the Japan Patent Office, the entire disclosure of which is incorporated by reference herein.

BACKGROUND

Technical Field

The present disclosure relates to an information processing apparatus, a method for detecting an abnormality, and a non-transitory recording medium.

Related Art

There are some techniques for detecting an abnormality occurring in an information processing apparatus. For example, there is known a technique for analyzing a cause of occurrence of the abnormality using a so-called crash dump that writes a content of a memory in a file at the time of occurrence of the abnormality.

There is also known a technique using an apparatus including a main body control unit and an operation control unit. The main body control unit includes a first monitoring unit to monitor whether or not a communication path between the main body control unit and the operation control unit is in a normal state. The operation control unit includes a second monitoring unit to monitor whether or not a communication path between an application unit of the main body control unit and an application unit of the operation control unit is in a normal state. Further, the operation control unit includes a unit that attempts to acquire an abnormality information indicating the content of the abnormality occurring in the main body control unit through a communication path different from the communication path monitored by the second monitoring unit.

SUMMARY

Embodiments of the present disclosure describe an information processing apparatus, a method for detecting an abnormality, and a non-transitory recording medium storing program codes for detecting the abnormality. An information processing apparatus includes circuitry. The circuitry generates an abnormal end file in response to an occurrence of an abnormal end of a process being executed, the abnormal end file indicating an occurrence state of the abnormal end, extracts a part of information from the generated abnormal end file, writes the extracted information as abnormal information in a memory, reads the abnormality information from the memory, and displays the abnormality information on a display.

An embodiment describes a method for detecting an abnormality, executed by the information processing apparatus. The method includes generating an abnormal end file in response to an occurrence of an abnormal end of a process being executed, the abnormal end file indicating an occurrence state of the abnormal end, extracting a part of information from the generated abnormal end file, writing the extracted information as abnormal information in a memory, reading the abnormality information from the memory, and displaying the read abnormality information on a display.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a view illustrating an example of an abnormal end file; and

FIG. 7 is a view illustrating an example of abnormality information.

Figure 1:
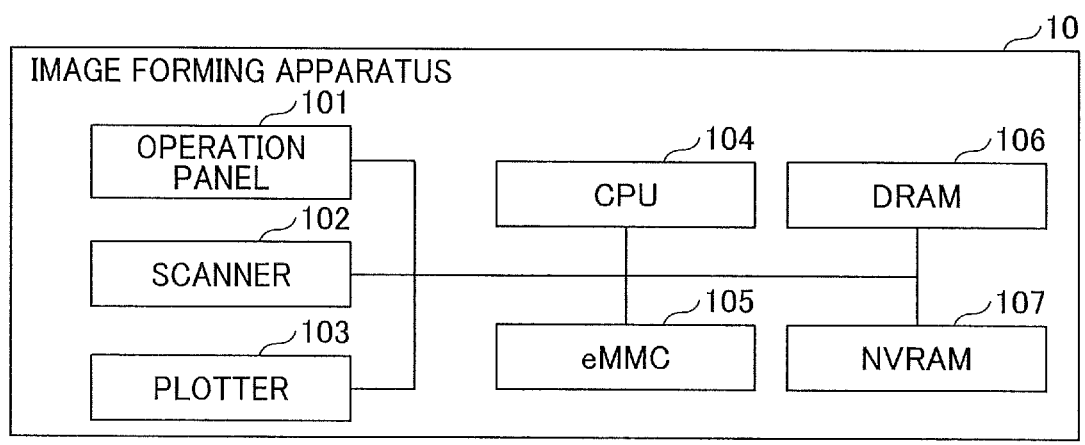
FIG. 1 is a block diagram illustrating an example of a hardware configuration of an image forming apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Referring now to the drawings, embodiments of the present disclosure are described below. As used herein, the singular forms "a," "an," and "the" are intended to include the plural forms as well, unless the context clearly indicates otherwise.

Hereinafter, embodiments of an image forming apparatus that is an example of an information processing apparatus according to embodiments of the present disclosure are described with reference to the drawings. The present disclosure, however, is not limited to the following one or more embodiments, and the elements of the following one or more embodiments include elements that may be easily conceived by those skilled in the art, those being substantially the same ones, and those being within equivalent ranges. Furthermore, various omissions, substitutions, changes, and combinations of the elements may be made without departing from the gist of the following one or more embodiments.

A description is given below, of embodiments of the present disclosure with reference to accompanying drawings. In the drawings, the same reference numerals are given to the same components, and redundant explanation may be omitted.

FIG. 1 is a block diagram illustrating an example of a hardware configuration of an image forming apparatus according to an embodiment of the present disclosure.

An image forming apparatus 10 illustrated in FIG. 1 is an example of the information processing apparatus and is an embedded device that includes a function of forming an image.

The image forming apparatus 10 includes an operation panel 101, a scanner 102, a plotter 103, a central processing unit (CPU) 104, an embedded multimedia card (eMMC) 105, a dynamic random access memory (DRAM) 106, and a non-volatile random access memory (NVRAM) 107. In addition, the image forming apparatus 10 includes a network interface (I/F) and a short-range communication circuit. The short-range communication circuit is a communication circuit in compliance with the near field communication (NFC), BLUETOOTH or the like. The network I/F is an interface for data communication with an external device through a communication network. The short-range communication circuit and the network I/F are electrically connected to the CPU 104 or an application specific integrated circuit (ASIC) through a peripheral component interconnect (PCI) bus. Any of the short-range communication circuit and the network I/F provides a network function as described below.

The operation panel 101 is a device that displays a plurality of kinds of information such as a function selection screen and receives an input from an operator. Specifically, the operation panel 101 includes a touch panel, a numeric keypad, a start key, and the like. The touch panel has both a display function and an input receiving function. The numeric keypad receives set values of various image forming parameters such as an image density parameter. The start key receives an instruction to start copying. The operation panel 101 is an example of a display unit.

The scanner 102 is a device that reads an image on a document and converts the read image into image data.

The plotter 103 is a device that forms an image on a recording medium such as paper.

The CPU 104 is a control device that controls a plurality of functions of the image forming apparatus 10. Specifically, the CPU 104 reads programs stored in the eMMC 105 and executes a plurality of processing defined in the read program.

The CPU 104 includes a logic circuit for performing an operation and a storage circuit called a register. The register is a storage area used for the operation performed by the logic circuit, can be accessed at high speed for writing and reading, and has a small storage capacity.

The eMMC 105 is a non-volatile memory and is a storage device that stores programs for executing a plurality of functions.

The DRAM 106 is a volatile memory and is a storage device used as a storage area for executing the plurality of functions. The DRAM 106 is used as a storage area of a RAM disk that can store data in a file format under control of the CPU 104.

The NVRAM 107 is a non-volatile memory and is a storage device that stores setting values and the like of the plurality of functions.

Figure 2:
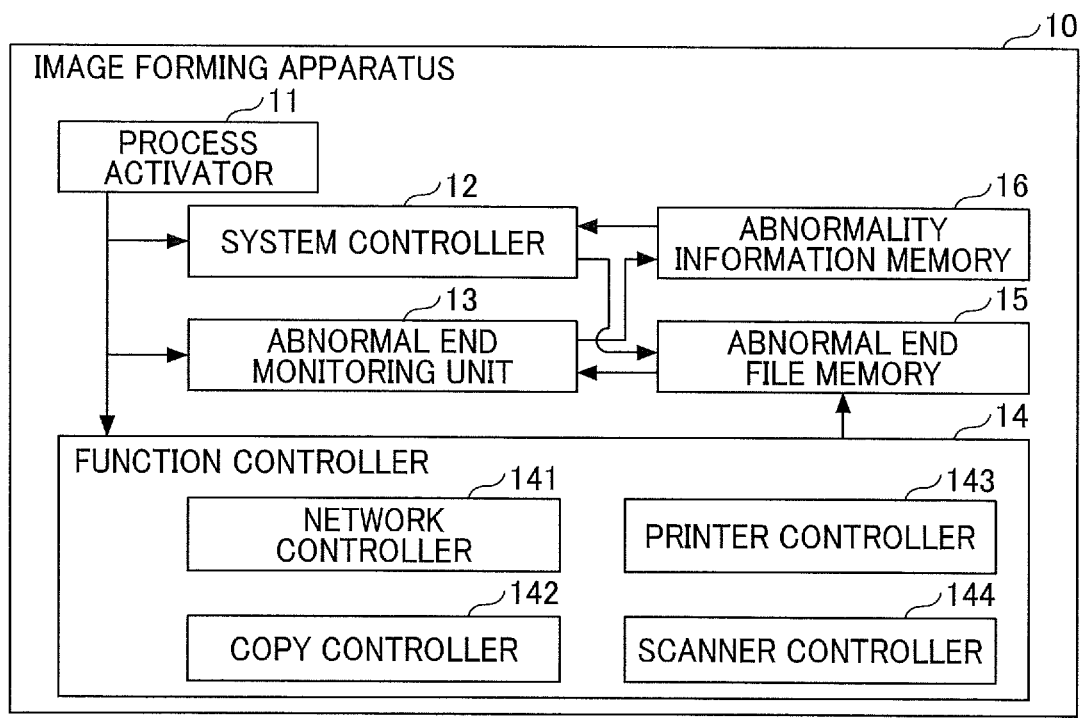
FIG. 2 is a block diagram illustrating an example of a functional configuration of the image forming apparatus according to one embodiment.

FIG. 2 is a block diagram illustrating an example of a functional configuration of the image forming apparatus according to the present embodiment.

The image forming apparatus 10 includes a process activator 11, a system controller 12, an abnormal end monitoring unit 13, a function controller 14, an abnormal end file memory 15, and an abnormality information memory 16.

The process activator 11 activates respective processes of the system controller 12, the abnormal end monitoring unit 13, and the function controller 14. A process is a unit of processing managed by an operating system (OS). Each process is uniquely identified by a process identifier (ID). The process activator 11 is implemented by the CPU 104 executing a function of the OS. For example, the process activator 11 corresponds to Systemd of LINUX.

The system controller 12 controls all the embedded systems included in the image forming apparatus 10. The system controller 12 is implemented by a system control process (a program) to be activated by the process activator 11.

The system controller 12 reads abnormality information from the abnormality information memory 16 and displays the read abnormality information on the operation panel 101.

The abnormal end monitoring unit 13 monitors the presence or absence of an abnormal end file in the abnormal end file memory 15. When the abnormal end file is present, the abnormal end monitoring unit 13 extracts a part of information from the abnormal end file and writes the extracted information in the abnormality information memory 16 as abnormal information. The abnormal end monitoring unit 13 is implemented by an abnormal end monitoring process (a program) to be activated by the process activator 11.

The function controller 14 controls the plurality of functions of the image forming apparatus 10. For example, the function controller 14 includes a network controller 141 that controls a network function, a copy controller 142 that controls a copying function, a printer controller 143 that controls a printing function, and a scanner controller 144 that controls a scanning function. The function controller 14 is implemented by a plurality of function control processes (a program) to be activated by the process activator 11.

Each of the system controller 12 and the function controller 14 generates the abnormal end file (abnormal end recording file) that indicates an occurrence state of an abnormal end when the abnormal end occurs in processing being executed. Then, the function controller 14 instructs the abnormal end file memory 15 to store the generated abnormal end file.

The abnormal end file memory 15 stores the abnormal end file. The abnormal end file memory 15 is implemented by the CPU 104 and the DRAM 106 that operate in cooperation. Specifically, the CPU 104 uses the DRAM 106 to build the RAM disk and stores the abnormal end file on the RAM disk. Since the DRAM 106 is the volatile memory, the abnormal end file disappears when the image forming apparatus 10 is turned off The abnormality information memory 16 stores the abnormality information. The abnormality information memory 16 is implemented by the CPU 104 and the NVRAM 107 that operate in cooperation. Since the NVRAM 107 is the nonvolatile memory, the abnormality information does not disappear even when the image forming apparatus 10 is turned off.

Next, the operations of the image forming apparatus 10 are described with reference to drawings.

The image forming apparatus 10 activates the OS in response to a power-on operation, and then starts processing of a process generation.

Figure 3:
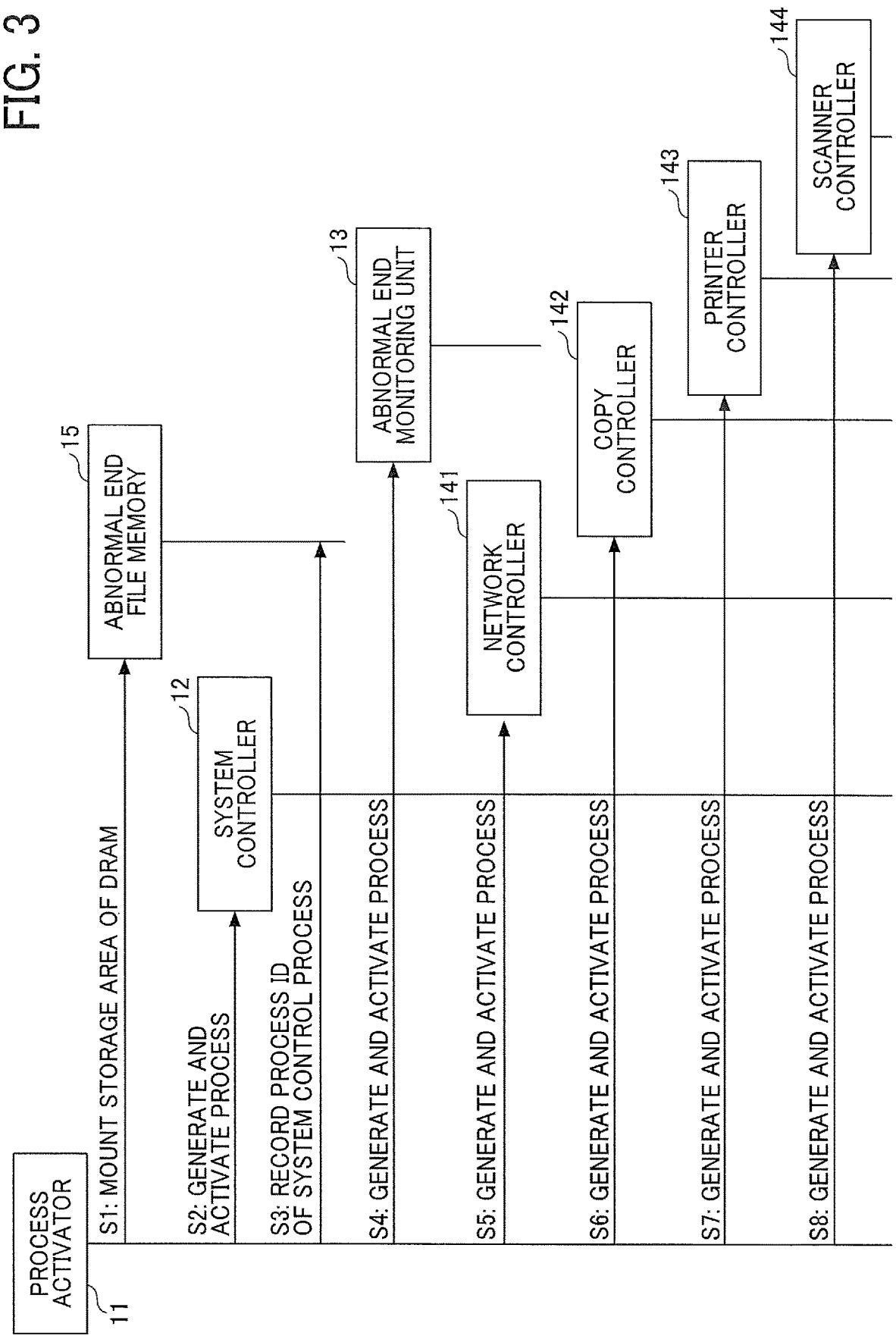
FIG. 3 is a sequence diagram illustrating an example of processing executed by a process activator of the image forming apparatus illustrated in FIG. 2.

FIG. 3 is a sequence diagram illustrating an example of processing of the process generation executed by a process activator.

In order to cause the DRAM 106 to function as the abnormal end file memory 15, the process activator 11 uses the DRAM 106 to build the RAM disk and mounts the storage area of the DRAM 106 in S1. In this case, to "mount" is a procedure for enabling the OS to use a file system of the RAM disk, such as a mount command of LINUX. Accordingly, each functional unit implemented by the CPU 104 can write and read the abnormal end file to and from the DRAM 106.

Next, the process activator 11 generates and activates the system control process that enables the system controller 12 to function in S2.

The process activator 11 records a process ID identifying the system control process on the RAM disk in S3.

Next, the process activator 11 generates and activates the abnormal end monitoring process that enables the abnormal end monitoring unit 13 to function in S4.

Subsequently, the process activator 11 generates the plurality of function control processes (device control processes) that enable each controller of the function controller 14 to function. The device control processes are for controlling operations of devices (e.g., the scanner 102 and the plotter 103) of the image forming apparatus 10 that is an example of the information processing apparatus. For example, the process activator 11 generates and activates a network control process that enables the network controller 141 to function in S5, and generates and activates a copy control process that enables the copy controller 142 to function in S6. Next, the process activator 11 generates and activates a printer control process that enables the printer controller 143 to function in S7, and generates and activates a scanner control process that enables the scanner controller 144 to function in S8.

When an abnormal end of a process occurs, each of the system controller 12 and the function controller 14 executes abnormal end processing immediately before the process ends.

Figure 4:
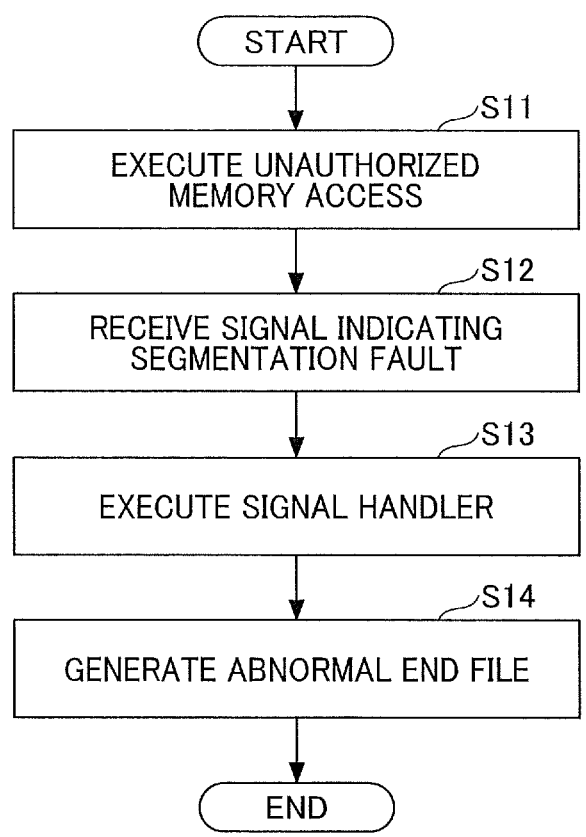
FIG. 4 is a flowchart illustrating an example of abnormal end processing according to one embodiment.

FIG. 4 is a flowchart illustrating an example of the abnormal end processing.

As an example, the abnormal end processing of the network controller 141 is described below. The network controller 141 executes, for example, an unauthorized memory access that causes the abnormal end in S11.

Next, the network controller 141 receives a signal that indicates a segmentation fault in S12. Specifically, when the OS detects the unauthorized memory access, the OS sends a signal called "segfault" to a source of the unauthorized memory access (in this example, the network controller 141).

The network controller 141 executes a signal handler in S13. The "signal handler" is a technique for executing specific processing when the signal is received. More specifically, the network controller 141 defines the processing to be executed in response to reception of "segfault" in advance, for the processing in the next step S14.

The network controller 141 generates the abnormal end file in S14. The processing of the step S14 is defined in advance as the signal handler. Thus, the network controller 141 can generate the abnormal end file at the abnormal end. The abnormal end file memory 15 stores the generated abnormal end file.

Although the network controller 141 is described as an example, the system controller 12 and the other function controllers of the function controller 14 can also generate the abnormal end file at the abnormal end in a similar manner.

Next, the processing to display the abnormality information is described below.

Figure 5:
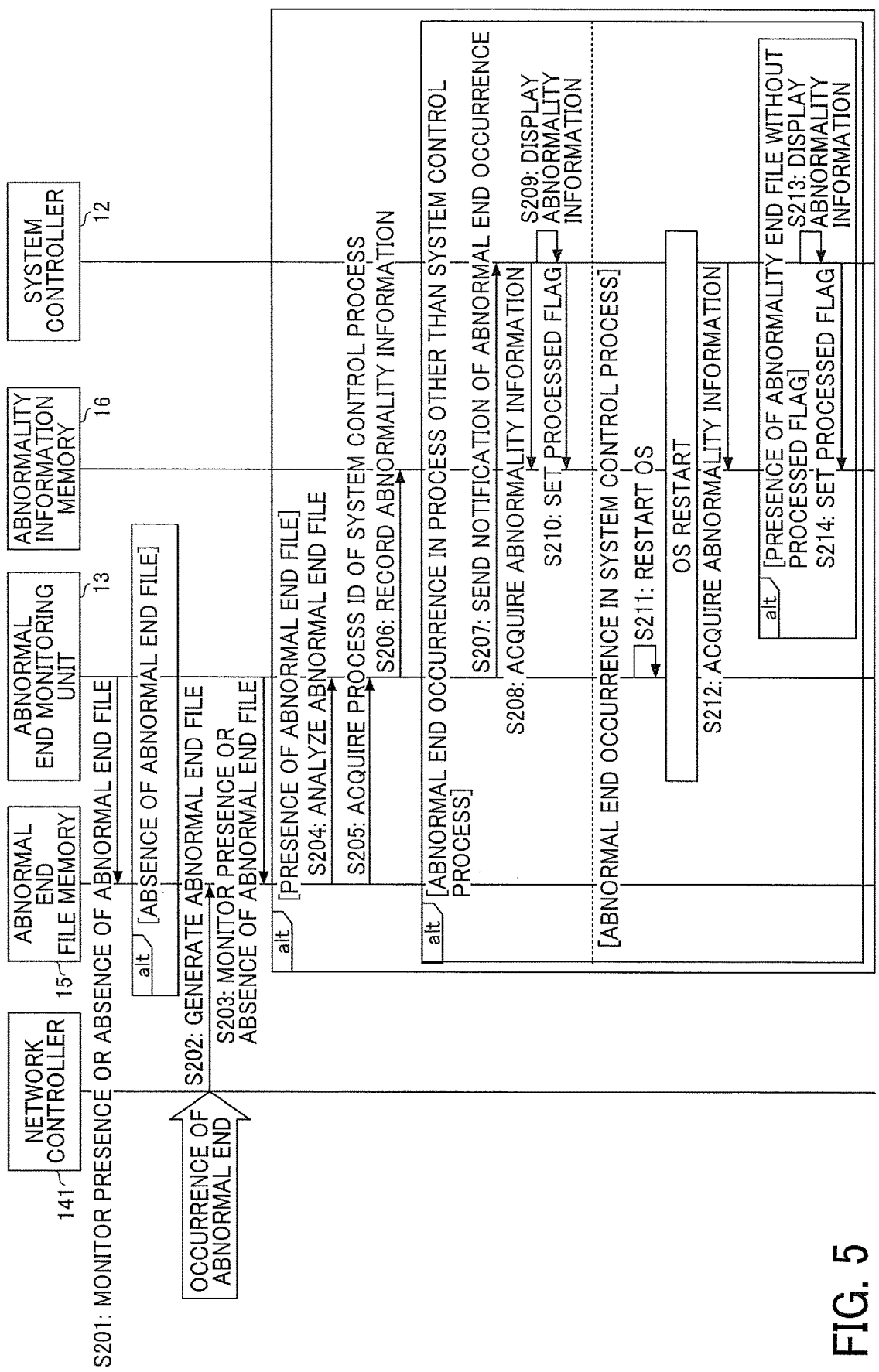
FIG. 5 is a sequence diagram illustrating an example of abnormality information display processing according to one embodiment.

FIG. 5 is a sequence diagram illustrating an example of the abnormality information display processing.

The process activator 11 generates and activates the abnormal end monitoring process, and then the abnormal end monitoring unit 13 starts monitoring the presence or absence of the abnormal end file in the abnormal end file memory 15 in S201. When the abnormal end file is absent in the abnormal end file memory 15, the abnormal end monitoring unit 13 continues monitoring without executing processing.

As illustrated in FIG. 4, for example, when the abnormal end occurs in the network controller 141, the network controller 141 generates the abnormal end file in S202.

The abnormal end monitoring unit 13 continuously monitors the presence or absence of the abnormal end file in S203. When the abnormal end file is present in the abnormal end file memory 15, the abnormal end monitoring unit 13 analyzes the abnormal end file in S204. Specific contents of the analysis are described later with reference to an example of the abnormal end file.

Next, the abnormal end monitoring unit 13 acquires the process ID of the system control process recorded in the abnormal end file memory 15 in S205. The abnormal end monitoring unit 13 extracts a part of information of the abnormal end file based on a result of the analysis of the abnormal end file and writes the extracted information as abnormality information in the abnormality information memory 16 in S206. The abnormality information memory 16 stores the generated abnormality information.

The abnormal end monitoring unit 13 acquires the process ID of the process that has caused the abnormal end file based on a file name and the like of the abnormal end file. Then, the abnormal end monitoring unit 13 determines whether or not the process ID of the process that has caused the abnormal end file is identical to the process ID of the system control process.

When the abnormal end occurs in a process other than the system control process, the abnormal end monitoring unit 13 determines that the process ID of the process that has caused the abnormal end file is not identical to the process ID of the system control process. In this case, the abnormal end monitoring unit 13 notifies the system controller 12 of the occurrence of the abnormal end in S207.

In response to receiving the notification, the system controller 12 acquires the abnormality information from the abnormality information memory 16 in S208. Then, the system controller 12 displays the acquired abnormality information on the operation panel 101 in S209.

Then, the system controller 12 sets a processed flag of the displayed abnormality information in S210. The processed flag is described later.

When the abnormal end occurs in the system control process, the abnormal end monitoring unit 13 determines that the process ID of the process that has caused the abnormal end file is identical to the process ID of the system control process. In this case, the abnormal end monitoring unit 13 restarts the OS in S211.

When the OS is restarted, the image forming apparatus 10 executes the processing of the process generation illustrated in FIG. 3. Then, the system controller 12 acquires the abnormality information from the abnormality information memory 16 in S212. That is, when the system control process is generated and activated by the process activator 11, the system controller 12 checks whether or not the abnormality information is stored in the abnormality information memory 16.

At this point, in a case that the OS has been restarted at step S211, the abnormality information relating to the abnormal end of the system controller 12 is stored in the abnormality information memory 16. Therefore, the system controller 12 can acquire the abnormality information relating to the abnormal end of itself.

When the abnormality information for which the processed flag is not set exists, the system controller 12 displays the acquired abnormality information on the operation panel 101 in S213. Then, the system controller 12 sets the processed flag of the displayed abnormality information in S214.

FIG. 6 is a view illustrating an example of the abnormal end file.

The abnormal end file 151 includes data items of "Cause," "Address," "PC," "REGA," "REGB," and "Backtrace."

The data item of the "Cause" is a character string indicating a factor that has caused an abnormal end.

The data item of the "Address" is a value indicating an address of a memory to which an unauthorized access or the like has made. The data item of the "Address" is, for example, the value of a control register (CR2).

The data items of the "PC," the "REGA," and the "REGB" are the values of a CPU register at the time of the occurrence of the abnormal end.

The data item of the "PC" is a position of a program (program counter) corresponding to processing that has caused the abnormal end. The data item of the "PC" is, for example, the value of an Extended Instruction Pointer (EIP) register.

The data item of the "Backtrace" is a character string written in a programming language. This character string indicates a content of the processing that has caused the abnormal end and is obtained by tracing back the program.

The file name of the abnormal end file includes a process ID and a process name, and is, for example, "(process ID).(process name).assert."

The above-described abnormal end file 151 is an example and may include various other information. Each of the system controller 12 and the function controller 14 generates the abnormal end file 151 according to a predetermined format. The predetermined format is, for example, defined by a designer or a manufacturer. The abnormal end monitoring unit 13, according to a predetermined format, decomposes the character string of the file name of the abnormal end file 151, extracts the values of the data items used for analysis, and generates the abnormality information. The predetermined format is, for example, defined by a designer or a manufacturer.

FIG. 7 is a view illustrating an example of the abnormality information.

Abnormality information 161 is preferably in a file format that uses a small data size, for example, in a comma-separated values (CSV) format including six items.

The first data item of the "processed flag" indicates whether or not the system controller 12 has normally executed processing to display the occurrence of the abnormal end. "T (True)" indicates that the processing has been executed, and "F (False)" indicates that the processing has not been executed. Note that "to set a processed flag" means that the processed flag is changed from "F" to "T."

The system controller 12 sets data of a row in which the value of the processed flag is "F" as a processing target. In addition, when there is a plurality of rows in which the value of the processed flag is "F," the system controller 12 processes the data of each row in order.

The second data item is the value of the "process ID" included in the file name of the abnormal end file 151 and is an identifier to identify a process in which the abnormal end occurs.

The third data item is the value of the "process name" included in the file name of the abnormal end file 151 and is the character string indicating the name of the process in which the abnormal end occurs.

The fourth data item is the value of the "Cause" included in the abnormal end file 151 and is the character string indicating the factor that has caused the abnormal end.

The fifth data item is the value of the "Address" included in the abnormal end file 151, indicating the address of the memory to which the unauthorized access or the like has made.

The sixth data item is the value of the "PC" included in the abnormal end file 151, indicating the position of the program (program counter) corresponding to the processing that has caused the abnormal end.

The abnormal end monitoring unit 13 can extract the value of any data item in the file name and the content of the abnormal end file 151 to list in the abnormality information 161 depending on a content of the abnormality. For example, the data item to be extracted may be determined for each type of the abnormality.

The image forming apparatus 10 of the present embodiment generates the abnormal end file 151 when the abnormal end occurs in the system controller 12 or any controller of the function controller 14. Then, the image forming apparatus 10 monitors the presence or absence of the abnormal end file 151, writes the abnormality information 161 in the nonvolatile memory when the abnormal end file 151 is present, and displays the abnormality information on the operation panel 101.

The abnormal end file 151 includes detailed information indicating the occurrence state of the abnormal end, which is similar to information included in a file generated by a so-called crash dump. On the other hand, the abnormality information 161 includes information sufficient for analyzing a cause of the occurrence of the abnormal end in the file format that uses a small amount of data. As a result, even in an apparatus having a limited storage capacity, the abnormality information 161 can be held in the memory and displayed on the operation panel, and thus analysis of the cause of the occurrence of the abnormal end can be facilitated.

Furthermore, when the abnormal end file 151 is generated in response to the occurrence of the abnormal end in the system control process, the image forming apparatus 10 promptly writes the abnormality information 161 in the nonvolatile memory and restarts the OS. Then, after the OS is restarted, the abnormality information 161 is displayed on the operation panel 101. Therefore, even when the abnormal end occurs in the system control process, analysis of the cause of the occurrence of the abnormal end can be facilitated.

Note that the information processing apparatus is not limited to the image forming apparatus 10 as long as the information processing apparatus includes a computer. The information processing apparatus may be, for example, a projector, an interactive white board (IWB; an electronic white board having a blackboard function capable of mutual communication), an output device such as a digital signage, a head-up display (HUD) device, an industrial machine, an imaging device, a sound collecting device, a medical device, a network home appliance, an automobile (connected car), a laptop PC, a mobile phone, a smartphone, a tablet terminal, a game console, a personal digital assistant (PDA), a digital camera, a wearable PC, or a desktop PC.

Each function of the embodiments described above can be implemented by one processing circuit or a plurality of processing circuits. Here, the "processing circuit or circuitry" in the present disclosure includes a programmed processor to execute each function by software, such as a processor implemented by an electronic circuit, and devices, such as an application specific integrated circuit (ASIC), a digital signal processor (DSP), a field programmable gate array (FPGA), and conventional circuit modules arranged to perform the recited functions.

Although the present disclosure has been described based on the respective embodiments, the present disclosure is not limited to the requirements described in the above embodiments. The elements of the above-described embodiments can be modified without departing from the gist of the present disclosure and can be appropriately determined according to the application form. Any one of the above-described operations may be performed in various other ways, for example, in an order different from the one described above.

The invention claimed is:

1. An information processing apparatus comprising circuitry configured to:
   receive a signal sent from an operating system of the information processing apparatus in response to an occurrence of an abnormal end of a process being executed, the signal being one approach to implementing inter-process communication, the process being a unit of processing managed by the operating system;
   generate an abnormal end file in response to the receiving signal, the abnormal end file indicating an occurrence state of the abnormal end;
   extract a part of information from the generated abnormal end file;
   write the extracted information as abnormal information in a memory;
   read the abnormality information from the memory;
   display the abnormality information on a display; and
   activate the process managed by the operating system.

2. The information processing apparatus according to claim 1, wherein the circuitry executes one or more programs to activate:
   a device control process to control a device of the information processing apparatus, the device control process being configured to generate an abnormal end file in response to an occurrence of an abnormal end of the device control process; and
   a system control process to control the operating system of the information processing apparatus, the system control process being configured to generate an abnormal end file in response to an occurrence of an abnormal end of the system control process.

3. The information processing apparatus according to claim 2, wherein:
   the circuitry:
      monitors the presence or absence of the abnormal end file;
      writes the abnormality information in the memory when the abnormal end file is present,
      notifies the system control process of the occurrence of the abnormal end when the abnormal end file is generated by the device control process; and
      restarts the information processing apparatus when the abnormal end file is generated by the system controller; and
   in response to a restart of the information processing apparatus, the system control process reads the abnormality information from the memory and displays the read abnormality information on the display.

4. The information processing apparatus according to claim 2, wherein:
   the circuitry determines whether the abnormal end file is generated by the device control process or the system control process based on whether the abnormal end file includes an identifier identifying the system control process.

5. The information processing apparatus according to claim 2, wherein:
   the abnormality information includes a value of a register of the circuitry that controls the device and the operating system.

6. A method for detecting an abnormality, executed by an information processing apparatus, the method comprising:
   receiving a signal sent from an operating system in response to an occurrence of an abnormal end of a process being executed, the signal being one approach to implementing inter-process communication, the process being a unit of processing managed by the operating system;
   generating an abnormal end file in response to the receiving signal, the abnormal end file indicating an occurrence state of the abnormal end;
   extracting a part of information from the generated abnormal end file;
   writing the extracted information as abnormal information in a memory;
   reading the abnormality information from the memory;
   displaying the read abnormality information on a display; and
   activating the process managed by the operating system.

7. A non-transitory recording medium storing a plurality of program codes which, when executed by one or more processors, causes the processors to perform a method for detecting an abnormality, executed by a computer, the method comprising:
   receiving a signal sent from an operating system in response to an occurrence of an abnormal end of a process being executed, the signal being one approach to implementing inter-process communication, the process being a unit of processing managed by the operating system;
   generating an abnormal end file in response to the receiving signal, the abnormal end file indicating an occurrence state of the abnormal end;
   extracting a part of information from the generated abnormal end file;
   writing the extracted information as abnormal information in a memory;
   reading the abnormality information from the memory;
   displaying the read abnormality information on a display; and
   activating the process managed by the operating system.

8. The information processing apparatus according to claim 1, wherein the circuitry is configured to write the abnormal end file in a first memory of the information processing apparatus and write the abnormal information in a second memory of the information processing apparatus, the second memory being different from the first memory.

9. The information processing apparatus according to claim 8, wherein the first memory is volatile memory and the second memory is nonvolatile memory.

10. The information processing apparatus according to claim 1, wherein the circuitry is configured to generate the abnormal end file by executing a signal handler in response to the receiving the signal.

* * * * *